United States Patent [19]

Dain

[11] 4,150,976
[45] Apr. 24, 1979

[54] METHOD FOR THE RECOVERY OF METALLIC COPPER

[75] Inventor: Richard J. Dain, Crouch, Nr. Borough-Green, England

[73] Assignee: Dart Industries Inc., Los Angeles, Calif.

[21] Appl. No.: 916,675

[22] Filed: Jun. 19, 1978

[51] Int. Cl.$^2$ .............................................. C22B 15/10
[52] U.S. Cl. .............................. 75/117; 75/101 BE; 75/108; 75/115; 75/121; 423/24; 423/41
[58] Field of Search ................... 75/117, 108, 101 BE, 75/115; 423/24, 41

[56] References Cited

U.S. PATENT DOCUMENTS

| | | | |
|---|---|---|---|
| 3,676,106 | 7/1972 | Hazen | 75/101 R |
| 3,810,827 | 5/1974 | Kane et al. | 75/101 BE |
| 3,848,069 | 11/1974 | Carey et al. | 75/101 BE |
| 3,894,139 | 7/1975 | Cardwell et al. | 423/24 |
| 3,933,971 | 1/1976 | Baucom | 423/54 |
| 3,950,488 | 4/1976 | Skarbo et al. | 423/24 |
| 4,006,214 | 2/1977 | Moser et al. | 423/112 |
| 4,016,056 | 4/1977 | DeMarthe et al. | 75/117 X |
| 4,043,882 | 8/1977 | Skarbo et al. | 423/24 X |
| 4,051,223 | 9/1977 | MacKay | 423/157 |
| 4,069,119 | 1/1978 | Wong | 75/101 BE X |

Primary Examiner—G. Ozaki
Attorney, Agent, or Firm—Bryant W. Brennan; Margareta LeMaire; Harold R. Beck

[57] ABSTRACT

An integrated process for the recovery of copper from impure copper bearing materials is provided by leaching the copper bearing material with sulfuric acid to convert the copper value to the soluble copper sulfate, selectively extracting the copper value from the leach liquor by contacting the liquor with an organic extractant stripping the copper from the organic copper extractant by contacting with liquor of enhanced acid content resulting from a subsequent reduction step, thus regenerating the organic extractant, contacting and thus reacting the acidified copper containing solution with an organic solution of amine extractant to reduce its acid concentration to a desired level, and recovering the copper metal by reacting the copper containing solution of lowered acid content with sulfur dioxide.

12 Claims, 1 Drawing Figure

METHOD FOR THE RECOVERY OF METALLIC COPPER

BACKGROUND

In recent years, increasing emphasis has been placed upon the development of hydrometallurgical processes for the recovery of copper metal from copper bearing materials. The intensification of efforts to provide effective and economical hydrometallurgical processes has stemmed from the increasing concern with the pollution and energy problems which accompany pyrometallurgical and electrolytic processes and with the developing necessity for the recovery of copper values from low copper content sources. Additionally, the application of hydrometallurgical processes enables the avoidance of the high capital investments needed for pyrometallurgical facilities.

In the past a number of hydrometallurgical processes have been suggested for direct production of copper metal without recourse to electrolytic processes. However, none of these has found any widespread acceptance due to various economic and technical problems which accompanied their application in commercial operations. The provision of an effective, economically feasible hydrometallurgical process leading directly to metallic product, therefore, remains a highly desirable objective in the copper industry. It has long been recognised that sulfur dioxide gas which is often produced in excess of requirements in primary producer plants, may be used to reduce copper sulfate to copper metal. However this reduction is accompanied by release of sulfuric acid which seriously reduces the efficiency of recovery of copper. Indeed unless the copper sulfate is alkaline, or contains very low free acid, the unreduced copper content in the raffinate makes the operation uneconomical. Use of neutralising agents such as lime or ammonia lead to unwanted by-products and make recirculation of unrecovered copper to the reduction process impractical. Furthermore the overall acid balance of the process is disturbed and make up acid is needed for other steps of the process to proceed under favorable conditions.

The use of amines in organic solution in a water immiscible diluent as a means of removing acid from aqueous metal bearing solutions is known, however it had previously been the practice to regenerate the amines by contacting the organic with an alkali aqueous solution.

SUMMARY

It has now been found that an efficient and commercially practicable hydrometallurgical process for the production of high purity copper can be realised through the combination of particular procedures in the overall system of producing copper metal from copper bearing materials. In accordance with the present invention, copper is recovered from a copper sulfate containing solution by treatment with sulfur dioxide or like reductant under controlled conditions while the sulfuric acid arising from the reduction process is extracted and recirculated to a leaching step common to hydrometallurgical processes for the production of copper sulfate liquor, by means of an organic solution of amine applied as an ion extraction reagent, and contacted with the acid bearing liquor in conventional contacting apparatus.

In the integrated process of the present invention, an impure copper bearing material is subjected to leaching with sulfuric acid to provide a weakly acidic solution of impure copper sulfate. The copper containing leach liquor is separated from the attendant insoluble residue and as a method of purification, and optionally concentration, is contacted with a suitable copper selective organic extractant for copper.

The organic extractant is employed in the form of a solution in water immiscible organic diluents. The resulting copper containing organic phase is separated from the aqueous phase containing reduced copper content, and the copper is stripped therefrom by a closed circuit aqueous flow of process liquor containing relatively strong concentration of sulfuric acid as well as residual copper values recirculated from subsequent process steps. The copper is stripped from the organic ion exchange reagent in the form of copper sulfate. The acidic solution enriched in copper values is separated from the organic phase containing the regenerated ion exchange reagent.

The strongly acidic solution of enriched copper content separated from the copper bearing organic phase in the copper stripping step is passed to an amine based solvent extraction ion exchange step for removal of a part of the acid content. The organic ion exchange reagent is an amine of suitable basicity carried in an organic diluent consisting of one or more organic solvents immiscible in water. On contacting the aqueous stream with the amine organic stream, an organic solution of amine salt is formed. The amine salt is separated from the deacidified copper containing solution and is then contacted in one or more stages with water to recover its sulfate content in the form of sulfuric acid and to regenerate the organic amine solution for return to the extraction stage of the acid removal process. The recovered acid is separated from the organic amine solution and returned to the leaching step of the process for reacting with further copper bearing material. The effluent from the copper selective solvent extraction ion exchange step may contain sufficient residual copper value to warrant its return also to the leach step either wholly or in part. The amount returned may be chosen to permit only acceptable build up of unwanted impurities in the system, and to retain an appropriate amount of acid feed to be leach step to ensure that the required acidity of leach liquor is maintained.

The aqueous stream of enriched copper content and reduced acid content leaving, successively, the strip stage of the copper selective ion exchange system and the extraction stage of the acid selective amine ion exchange system, is contacted with sulfur dioxide gas or like reductant under conditions of controlled temperature and pressure to reduce the copper present to metallic powder or crystalline form, which may then be extracted for washing and drying by known techniques. The shape and form of copper product can be controlled by recirculation of minor quantities of copper product particles. The extent to which copper values are reduced depends on the acidity level of the feed liquor, the temperature, the copper concentration, the time of reaction and the molar ratio of sulfur dioxide to copper. Residual copper value as copper sulphate in aqueous solution together with additional sulfuric acid formed as a result of the reduction reaction is recirculated to the copper stripping step of the aforesaid copper selective ion exchange system, where additional copper value is transferred to the aqueous stream from the organic ion exchange reagent.

By providing for the recovery of the copper value by direct reduction under controlled conditions, in a closed circuit recirculatory system, high yields of high purity copper are obtained. The recovery of surplus acid product from the reduction step using an amine based ion exchange step enables this acid value to be applied in the leaching step of the process in place of acid from other sources. The combination of the several process steps enables the realization of an efficient and economical integrated process.

The use of amines in organic solution in a water immiscible diluent as a means of removing acid from aqueous metal bearing solutions is known, however it had previously been the practice to regenerate the amines by contacting the organic with an alkali aqueous solution. In the described process the amine used is regenerated by a single or multiple water wash to produce an acidic sulfate stream which may be used in the leaching step of the associated process. In this way the production of unwanted by-products is avoided, and the process overall acid requirement is reduced or eliminated.

The process described in this invention applies amine solvent extraction of sulfuric acid to maintain acid levels and acid balance in a closed circuit aqueous process flow which is an integral part of the whole process and from which a part of the copper value is removed on each pass of the aqueous liquor through the sulfur dioxide reduction step. Acid evolved by reason of the reduction reaction is retained in the recirculating process flow while it passes the stripping stage of the copper selective ion exchange step. In this way the raised concentration of acid enables efficient stripping of further copper values into the recirculating stream and efficient, substantially total regeneration of the copper-selective ion exchange reagent. The efficiency of these functions controls the efficiency of extraction of copper values from the leach liquor feed to the selective ion exchange extraction step of the process. On leaving the stripping step of the copper selective ion exchange system the recirculating aqueous liquor stream passes an amine based ion exchange step in which an amount of acid equivalent to that released in the reduction step is transferred by reaction and adsorption to the organic solution of amine to form inter alia amine salts, thus maintaining acid balance in the system, and supplying copper sulfate of reduced acid content to the succeeding reduction step.

BRIEF DESCRIPTION OF THE DRAWING

The FIGURE is a simplified overall process flow sheet illustrating the integrated process of the present invention.

BRIEF DESCRIPTION OF THE PROCESS

Figure 1:
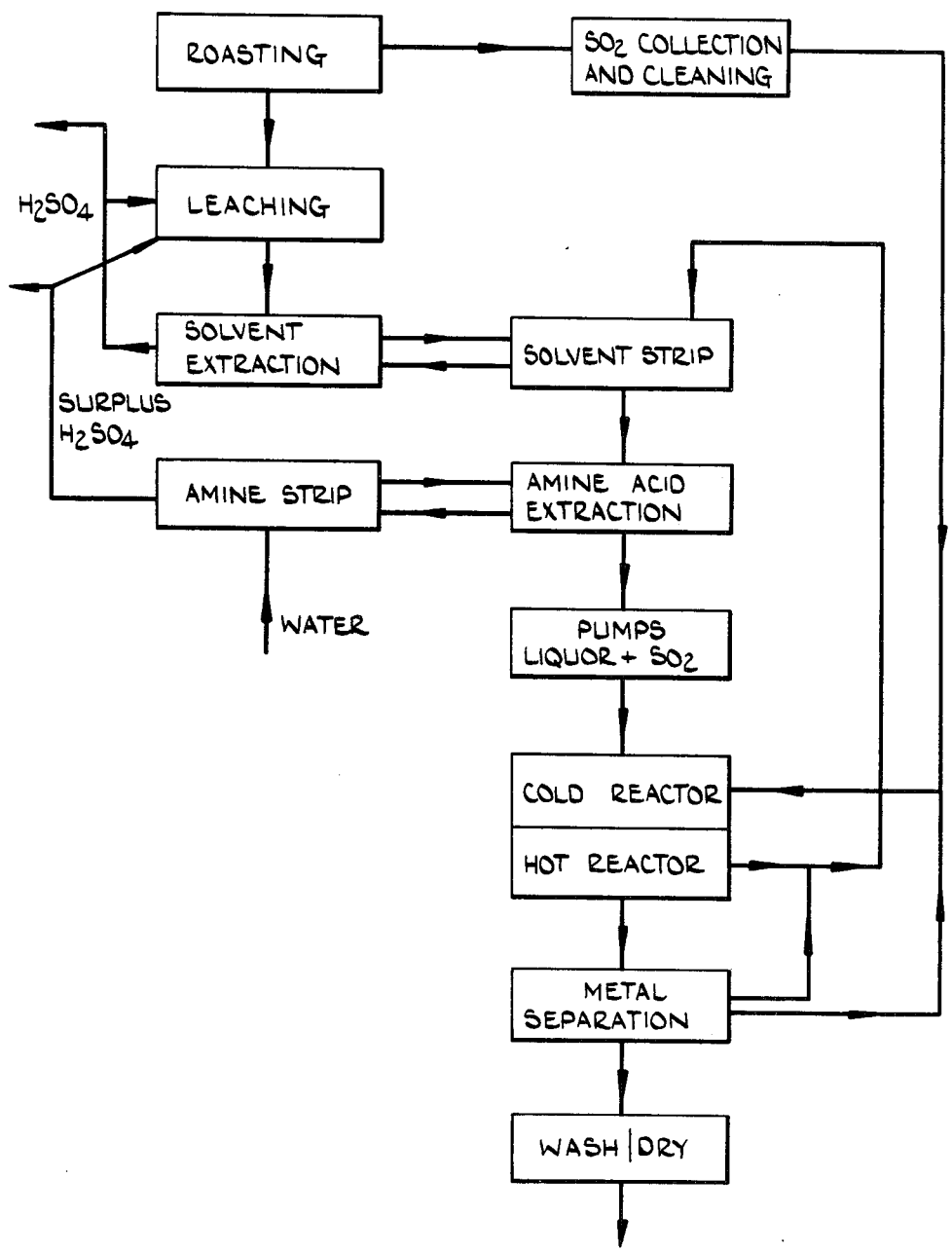

In the process according to the FIGURE, operation of this process for the recovery of copper according to the present invention involves no special processing apparatus and employs equipment familiar to those working in the field of metals recovery.

As illustrated in the FIGURE the starting material is a copper oxide obtained by crushing and milling a sulfide ore of copper and then roasting it to drive off sulfur dioxide gas.

The sulfide ore or other copper bearing material is obtained by procedures which are known in the art and which do not form any part of this invention. No further details of such preparations are considered necessary for a full understanding of the present invention.

The exothermic reaction of the roasting process results in the production of copper oxide and sulfur dioxide according to the following reaction:

$$2CuFeS_2 + 13O_2 \rightarrow 2CuO + Fe_2O_3 + 4SO_2$$

The sulfur dioxide produced is collected, cleaned and passed to a subsequent stage of the process for use therein. The impure copper oxide produced is subjected to leaching employing sulfuric acid as the leaching medium. The leaching results in the production of a mildly acidic impure copper sulfate solution which is then separated from the solid residues of the leaching operation.

The copper sulfate solution is then passed to a copper purification step of a type known in the art, preferably one in which the copper values present are extracted by ion exchange using a selective organic extractant reagent dissolved in a suitable water immiscible hydrocarbon diluent. The copper values loaded into the organic solution are separated from the aqueous raffinate and are then stripped from the organic solvent by the action of contacting it with an aqueous solution containing relatively strong sulfuric acid.

According to a further essential feature of the present invention the acidic copper bearing aqueous liquor after leaving the strip stage of the copper selective ion exchange system, is contacted with a suitable solution of amine in an aqueous immiscible organic hydrocarbon diluent or diluent to extract the sulfuric acid therefrom. This recovered sulfuric acid is then applied in the initial leaching step, together with all or part of the effluent from the extraction stage of the copper selective ion exchange system.

In accordance with the integrated process of the present invention, the copper sulfate purified by the ion exchange system, and lowered in acid content by the amine acid extraction ion exchange system, is thereafter contacted with a reductant, illustratively sulfur dioxide, under controlled conditions for a period of time sufficient to form the required proportion of the final copper metal product, which is then recovered, washed, and dried according to known techniques.

Considering the process shown in the FIGURE in greater detail, the copper bearing material which is treated in accordance with the present invention can be copper sulfide or copper oxide ores, copper ore concentrates, materials from tailings, dumps or any other source of copper which may be used to provide a solution of copper sulfate, which solution may be extracted by ion exchange system using suitable ion exchange reagent.

The copper source, here a copper oxide obtained by roasting a copper sulfide type ore, is leached with sulfuric acid to a terminal pH level of 2.4. The leaching operation is normally conducted at or near ambient temperature and ambient pressure although any known form of leaching which will produce a solution suitable for ion exchange extraction can be employed. The terminal pH level can be varied to suit particular copper source material and the ion exchange reagent employed to extract and purify the copper sulfate, but is preferably in the range 1.5 to 4.0 when treating acid leached copper material. Notwithstanding this, ammoniacally leached solutions of copper may also be applied in the process to produce a feed to the copper selective ion exchange system and in turn yield copper sulfate by acid stripping in the strip stage of the ion exchange system.

The slurry from the leaching step is treated to separate the impure copper bearing pregnant leach liquor from the solid leach residues. The details of this separation do not constitute part of this present invention. Illustratively the slurry can be subjected to thickening and filtration to effect the separation.

Following separation, the pregnant leach liquor containing copper sulfate is passed to an ion exchange system for purification and, optionally, concentration of the copper sulfate. The organic extractant reagents used in the practice of the present invention include hydrocarbons having a straight chain of 9 or 10 carbon atoms terminating in an oxime group modified by adjacent hydroxy or other chemical groups. Among such compounds are those marketed by General Mills under the trade name LIX. These copper selective organic ion exchange extractant reagents are normally used dissolved in a water immiscible organic diluent, including alkyl and aryl hydrocarbons such as kerosine, benzene, toluene, petroleum fractions, and the like in addition to chlorinated hydrocarbons such as perchlorethylene and the like. The preferred diluent in the process of the present invention is known under the trade name Escaid 100 supplied by the Exxon Oil Corporation. The concentration of the organic reagent in the organic diluent is chosen to be appropriate to the copper content of the leach liquor and is in the order of from 2 to 40% by weight and is preferably between 15 and 30% by weight. The ratio of the organic phase containing the ion exchange reagent to the aqueous phase comprising the copper containing leach liquor may range from between 5:1 and 1 to 50, but is typically in the range 1:2 to 2:1. Extraction is carried out by mixing the aqueous phase with the organic phase in multi-step contra flow manner to affect mass transfer of the copper ions present in the aqueous liquor to the organic reagent in accordance with the following equation (where R represents the organic reagent):

$$2RH(org) + CuSO_4(aq) \rightarrow R_2Cu(org) + H_2SO_4(aq)$$

Extraction is generally carried out in mixer settler units, but other contacting equipment may be used. The copper bearing aqueous solution is well mixed with the organic extractant in a mixer to permit mass transfer, and then the two phases are permitted to separate and disengage in a settler tank. Generally two to five stages of contacting and settling are needed for substantially complete extraction of all the copper values, one stage being defined as one mixer settler.

Transfer of the copper to the organic phase is ordinarily completed in less than three minutes residence time per stage, although longer or shorter mixing times may be employed if desired. On completion of the extraction operation, the mutually immiscible aqueous and organic phases are allowed to separate, and the separated phases are individually withdrawn from the settling tank for subsequent treatment.

In the copper stripping step of the process, the organic phase containing the copper values is stripped of its copper content by contacting the organic solution with an aqueous solution containing sulfuric acid of free acid content at least about 50 grams/liter of sulfuric acid and preferably from 50 to 350 grams/liter sulfuric acid in one or more stages. The chemical reaction may be represented by the reverse of the extraction reaction as follows:

$$R_2Cu(org) + H_2SO_4(aq) \rightarrow 2RH(org) + CuSO_4$$

The copper containing organic phase and the sulfuric acid containing aqueous phase are thoroughly mixed together to effect transfer to the copper ions from the organic to the aqueous phase with the concomitant regeneration of the organic extracting reagent.

The copper content of the organic phase is reduced to below about 1 gram/liter of copper, depending on the organic to aqueous phase ratio, the copper content of the organic phase, the concentration of copper and sulfuric acid in the aqueous phase, the number and type of contacting stages, the temperature and pressure of operation and the choice of organic reagent. Transfer of the copper from the organic to the aqueous phase is substantially completed within about one minute, although longer mixing times can be employed, and copper stripping efficiencies well in excess of 90% are normally obtained. The ratio of organic to aqueous phase may range from about 0.5:1 to about 50:1, and preferably is within the range of from 5:1 to 20:1.

An essential feature of the process of the present invention is the removal and recycle for use in the process of sulfuric acid taken from the acidified liquor leaving the copper ion exchange stripping step. Without the acid in the recirculating flow from the reduction step to the strip step, the efficient removal of acid from the copper bearing organic ion exchange reagent and regeneration of that reagent would be difficult. If the acid level of the feed liquor to the reduction step is too high, copper metal is not produced; with release of copper metal in the reduction step there is a related production of sulfuric acid. Removal of this extra acid is essential to maintain an acid balance in the circulating fluids, and maintain production of copper metal.

After the copper values have been extracted, purified and optionally concentrated in the copper selective ion exchange system, the resultant acidified aqueous solution containing the copper values and the sulfuric acid is passed to a second ion exchange system based on amine reagent which selectively removes a controlled amount of sulfuric acid from the circulating liquor stream, sufficient to maintain an acid balance in the process and to ensure efficient recovery of copper in the subsequent reduction stage.

The amines used in the practice of the present invention include alkyl amines in general and in particular weakly basic amines and amines of medium strength basicity such as monoamines and tertiary amines. Among such compounds are those marketed by Ashland Chemicals under the trade name Alamene, and particularly the tertiary amine Alamene 336. These acid selective extractant reagents are normally used dissolved in a water immiscible organic diluent, of the type described above as used with copper selective reagents. The preferred diluent in the process of the present invention is Escaid 100, a substantially aromatic hydrocarbon diluent. It is found desirable to modify the diluent by addition of a small percentage of an alcohol such as isodecanol to inhibit the production of a three phase dispersion during mixing, contacting and settling which slows the process of mass transfer and the process of coalescence in settling. The amount of alcohol added is related to the concentration of amine in the diluent and the nature of the diluent but is typically in the range of from one-half to twice the quantity of amine in the diluent. The concentration of the amine extractant in the diluent is selected to be as high as is sufficient amine is circulating to react with the amount of acid to be removed in the available contact time. Typically the organic to aqueous flow ratio will be of the order of 40 to 1, but this value may be varied widely according to particular circumstances. Where high ratios are used it is common practice to recirculate the minor flow from the settler tank effluent to the mixer to ensure a proper balance of the two phases in the mixing process to keep the dispersion conditions stable.

Extraction is carried out by mixing the aqueous phase with the organic phase in multiple step contraflow manner to affect transfer of the sulfate ions to the amine to form an organic solution of amine salt. Extraction is generally carried out in mixer settler units, except where many stages are needed, in which case the Graesser (raining bucket) type of rotary contactor is preferred. The acid bearing aqueous liquor is well mixed with the organic amine solution to permit mass transfer of the sulfate ion to the amine, and the two phases are permitted to disengage in a quiescent settling zone of the equipment. Generally at least two stages of extraction and possibly of the order of as many as forty stages are required to complete the removal of the necessary amount of acid, one stage being defined as one mixing and settling process.

Transfer of the acid to the organic phase is ordinarily completed in less than half a minute of mixing time per stage, although longer or shorter mixing times may be employed if necessary. On completion of the contacting step, the separate phases are disengaged and individually transferred to subsequent steps in the process.

In the acid stripping step of the process the organic amine salt is stripped of its sulfate ion by contacting the organic solution with water. The sulfate containing organic and the water are thoroughly mixed together to effect the partial transfer of the sulfate ion from the organic to the aqueous phase with the concomitant partial regeneration of the amine extractant for return to the acid removal step by recycling flow. The acid level of the wash water is raised to a concentration determined by the concentration of the amine salt in the organic liquor and by the chosen phase ratio of aqueous to organic in stripping. Since the concentration of the amine salt in the organic is determined by the concentration of sulfate ion in the acidic stream, where acid is being removed from a liquor of high metal sulfate content the loading of the amine may be such that in certain circumstances recovered acid of somewhat higher concentration than the free acid in the original liquor.

Transfer of the sulfate ion to the wash water is substantially completed within about one minute, although longer mixing times may be employed if desired. Acid stripping efficiencies of about 50% are normally obtained. The ratio of organic to aqueous phase may range from 1:1 to 70:1 and is preferably in the range of 5:1 to 40:1.

On completion of the acid removal step, the copper sulfate containing liquor of reduced acid content is then treated with sulfur dioxide or like reductant to produce copper powder of high purity.

In the preferred practice of the invention, sulfur dioxide is employed as the reductant. It is not necessary that sulfur dioxide per se be used, the invention embracing the use of substances such as sodium sulfite from which sulfur dioxide can be generated.

As illustrated in FIG. 1, the treatment with sulfur dioxide can be carried out in one or more stages of increasing temperature level, optionally one stage being effected at ambient temperature and pressure and at least one of the remaining stages being effected at elevated temperature and pressure. Suitably final reactor temperatures of from 102 to 220 degrees Celsius can be employed, the use of temperatures within the range of from 110 degrees to 180 degrees Celsius being preferable, and a temperature of 140 degrees Celsius being the temperature of choice. The particular temperature selected will be based on the rate of reaction. The reduction period will be from 2 minutes to about 180 minutes or more with the molar ratio of sulfur dioxide to copper being about 1:1 to 1.8:1. Similarly, pressures of from about 20 psig to about 90 psig are particularly preferred and a pressure of 55 psig is considered most desirable.

The following Examples illustrate the invention and the several aspects thereof, but are not to be considered as limiting the scope of the invention.

EXAMPLE 1

Ground ore containing 2.89 lbs of $CuFeS_2$ is roasted providing 1.25 lbs of copper oxide and 1.01 lbs of sulfur dioxide. The sulfur dioxide is collected, cleaned and applied as described in a later copper reduction step of the process. The copper oxide is leached with sufficient diluted sulfuric acid to achieve a terminal pH of 2.4. Leaching is carried out at near ambient temperature and pressure.

The effluent from the leaching step, comprising a solution of 5 grams per liter of copper sulfate in aqueous solution of sulfuric acid at pH 2.4, is passed to a liquid ion exchange solvent extraction step, in which the copper sulfate-containing solution is contacted with a solution containing 20% of Lix 64N copper selective ion exchange extractant, in Escaid 100 diluent, at or near ambient temperature, the proportion of organic to aqueous solution flows being 1:1 during mixing. The process of extraction is carried out in three separate stages of contraflow mixing and settling. The aqueous raffinate from the extraction step contains 0.05 grams per liter of copper value and is raised in acid content to approximately pH 2 by reason of the ion exchange process. A proportion of 70% of this raffinate is returned to the leaching process for recirculation of the copper value and utilisation of the acid content. The remaining 30% of the raffinate is rejected together with impurities which would otherwise build up in the circuit.

The copper containing organic phase from the extraction stage of the ion exchange step is transferred to a stripping mixer settler system where it is contacted with an acidified aqueous flow containing recycled copper as copper sulfate at 30.2 grams per liter and free acid 133 grams per liter. This represents a total acid content of 180 grams per liter. Contacting is carried out in a mixer settler system of two stages in contraflow manner operating with an organic to aqueous flow ratio of 3.95 to 1. The aqueous strip liquor is thus loaded to a copper content level of 50 grams per liter, by addition of 19.8 grams per liter of copper as copper sulfate. The free acid level of the aqueous strip liquor is thereby reduced to 103 grams per liter of sulfuric acid. The organic extractant is thereby regenerated and returned to the extraction stage for further use.

The aqueous strip liquor is separated from the organic solution of Lix 64N and is passed to an amine acid removal step where it is contacted with an amine solution of Alamene 336 (substantially trioctylamine) in Escaid 100 diluent at 10% concentration of Alamene 336; this organic solution being modified by addition of 10% of isodecanol. Contacting is carried out at an overall organic to aqueous ratio of 25 to 1, though recycling of the aqueous flow to the mixer is arranged to ensure mixing is done at or near an organic to aqueous ratio of 1:1. Two contraflow stages of mixing and separation are used. The organic entering the contacting system contains 19.4 grams per liter of acid value, and after contacting 20.7 grams per liter, primarily as amine sulfate. Under certain circumstances, some acid may be transported by the organic by means other than formation of amine salt. The acid loaded organic flow is separated from the aqueous stream and transferred to a water stripping step in which acid is recovered from the organic flow. The organic is contacted with water at an organic to aqueous ratio of approximately 59:1, in one stage of mixer settler. Mixing as previously is done at an organic to aqueous ratio of about 1:1 by recirculation of the aqueous flow. The product acid contains approximately 80.9 grams per liter of sulfuric acid and 1.28 grams per liter of acid value is removed from the amine circuit.

The amine is regenerated by this water contacting and is returned to the extraction step to recover more acid. The aqueous flow containing reduced acid level and the copper values consist of copper as sulfate, at 50 grams per liter, free sulfuric acid 72.5 grams per liter, and total acid 149.5 grams per liter.

This aqueous solution is passed to an autoclave reduction step, in which it is heated to a temperature level of 140° C. at pressures from a range of about 50 to about 200 psig according to the stage of the reaction and the rate at which this proceeds. Pressure ranges of from about 50 to 400 psig can be employed. For each pound of copper value in the autoclave, 1.2 lbs of sulfur dioxide gas is injected so as to maintain an overall molar ratio approximately 1.2 to 1 of $SO_2$ to copper.

The solution is held in the autoclave for a period of 45 minutes, and is then cooled and discharged. The liquor then contains 30.2 grams per liter of copper as sulfate, and 133 grams per liter of free acid. This liquor is recirculated to the copper ion exchange stripping step.

In addition 19.8 grams per liter of copper metal as fine crystals or particles is removed from the liquor by filtration, although other suitable means may be employed, is washed and dried.

On discharge of the liquor, 0.2 lbs of sulfur dioxide gas may be recovered for reuse in the succeeding reduction cycle, for each pound of copper produced.

In order to demonstrate the efficacy of the copper sulfate reduction step as well as that of the amine extraction step for the removal and recovery of sulfuric acid, additional tests were carried out. These tests and the results thereof are set forth in the following Examples.

EXAMPLE 2

A series of tests are carried out in an autoclave on a liquor containing 50 grams per liter of copper and having a free acid content of from 0 to 100 grams per liter of sulfuric acid. The tests are carried out at a temperature of 140 degrees Celsius for a period of 45 minutes. The $SO_2$/copper molar ratio is 1.2 to 1. The results show that the relationship between free acid and percentage recovery of copper metal is as follows:

| Free acid gpl | % Recovery |
|---|---|
| 20 | 59.8 |
| 40 | 54.5 |
| 60 | 46 |
| 80 | 37 |
| 100 | 29.5 |

EXAMPLE 3

A 1 liter solution containing 0.5 mol of copper as copper sulfate, 0.6 mol of sulfur dioxide gas and 0.3 mol of free sulfuric acid is heated at 140 degrees Celsius for three hours in a glass lined autoclave. Copper metal is recovered from the reaction solution by filtration, washed and dried, providing a yield of copper of 69%.

EXAMPLE 4

Seven 10 ml sealed tubes, each containing a solution of 0.5 mol of copper as sulfate, 0.6 mol of sodium sulfite, ad 1.2 mol of sulfuric acid having a free acid equivalent content of 60 grams per liter, are placed in an autoclave containing water and heated to 140 degrees Celsius, held at that temperature for periods of up to 5 hours and allowed to cool overnight. Copper metal is recovered from each timed test. After approximately 5 hours of heating it is clear from the results that little further reaction will occur.

| Time at top temperature - Hours | Percentage completion |
|---|---|
| 1 | 70% |
| 2 | 85% |
| 3 | 92% |
| 4 | 97% |
| 5 | 100% (assumed basis). |

EXAMPLE 5

Seven 10 ml test tubes containing a standard solution of 1.2 molar sulfuric acid and 0.6 mol sodium sulfite are each enriched by addition of copper sulfate in amounts chosen to vary the molar ratio of equivalent $SO_2$/Cu as shown in the Table below. The percentage recovery of copper as metal is recorded, when heated for 3 hours at 140° C.

| Initial molar ratio of $SO_2$/Cu | Percent Recovery of Metallic Cu |
|---|---|
| 0.6 | 41.5 |
| 0.8 | 46 |
| 1.0 | 49.5 |
| 1.2 | 52.5 |
| 1.5 | 55.5 |
| 2.0 | 58 |
| 3.0 | 60.8 |

EXAMPLE 6

Solutions of 0.5 mol copper sulfate and 0.6 molar sodium sulfite together with sufficient sulfuric acid to give a free acid level of 20, 60 and 120 grams per liter, are reacted together in an autoclave for 3 hours, the experiment being repeated at four different temperatures. The percentage recovery of metallic copper is as follows:

| Temperature °C. | Free acid 20 gpl Recovery % | Free acid 60 gpl Recovery % | Free acid 120 gpl Recovery % |
|---|---|---|---|
| 100 | 40.5 | 17 | 3 |
| 120 | 60.5 | 42 | 14 |
| 140 | 73 | 57 | 31 |
| 200 | 86 | 77 | 59 |

EXAMPLE 7

An organic solution containing 5% weight/volume Alamene 336 and 10% weight/volume isodecanol in Escaid 100 is prepared. Aliquots of the organic are shaken with equal volumes of aqueous sulfuric acid of various known strengths. After phase separation the organic layers are analysed for acid and the aqueous acid concentrations calculated. The Table below illustrates some of the results:

| Acid in Aqueous Normality | Acid in Organic Normality | % Theoretical Loading of the Organic with Acid |
|---|---|---|
| 1 | 0.17 | 66 |
| 2 | 0.2 | 77.8 |
| 3 | 0.224 | 87.2 |
| 4 | 0.239 | 93 |
| 5 | 0.246 | 95.7 |

EXAMPLE 8

A quantity of unloaded organic as used in experiment 7 is shaken with an equal volume of sulfuric acid of strength in excess of 5M. After phase separation, the organic is found to contain 0.28 N sulfuric acid. This is equivalent of 110% of theoretical loading and demonstrates that acid may be carried by addition as well as by reaction with the amine.

EXAMPLE 9

Aliquots of the amine solution as loaded in experiment 8 are shaken with volumes of water to give initial organic to aqueous phase ratios of 1,5,10,20,30 and 50. After phase separation the layers are analysed for acid. The relationship between acid in the organic and aqueous after reaction are found to lie on the same curve as those derived for loading organic in experiment 7 above. Thus equilibrium may be easily approached from either direction and a strong aqueous acid concentration may be produced from a weak organic solution. For example an organic containing 13.7 gpl (0.28N) acid will yield an aqueous containing 142 gpl sulfuric acid (2.9N) so long as the phase ratio is high enough.

EXAMPLE 10

Solutions of Alamene 336 in Escaid 100 diluent were prepared by weight, in the concentration range 5 to 50% weight/volume. A 10 ml sample of each solution is fully loaded with sulfuric acid by shaking with 10N acid in aqueous solution. After separation by centrifuging the solutions are examined for third phase formation. When two organic layers, in addition to the aqueous layer are observed, isodecanol is added stepwise until after further shaking, and separation, only two layers — organic and aqueous are observed. The necessary addition of isodecanol to suppress third phase formation is found to be as follows:

| % weight/volume Alamene | Approximate isodecanol requirement |
|---|---|
| 5 | 2.75 |
| 10 | 3.75 |
| 20 | 5.3 |
| 30 | 5.25 |
| 40 | 3.75 |
| 50 | 1.1 |

EXAMPLE 11

The formation of a third phase, that is, a second organic phase, is found to occur with acid-loaded amine solutions, that is with the amine sulfate for example. The addition of an alcohol, such as isodecanol, is found to suppress the formation of the third phase. The quantity of isodecanol required is found to be dependent on the aromatic and aliphatic content proportion of the diluent, less alcohol being required for diluents with high aromatic content. A 25% weight/volume solution of Alamene 336, fully loaded with sulfate in an aromatic diluent, Escaid 100, is found to exhibit third phase formation as the content of isodecanol is increased to 4.9%, at which stage the third phase disappeared and increasing amounts of isodecanol caused no change.

A similar amine solution dissolved in a diluent of 99% aliphatic content is found to need 7.3% addition of isodecanol before the third phase was no longer apparent.

While the acid removal process of the present invention has been described in connection with its use in an integrated process for the recovery of copper from impure copper bearing materials, it has advantageous applications in many other industrial process.

Among these industrial applications are included treatment of bleed streams in electrolytic process, the recovery of waste acid from plating baths, the ilmenite process for the recovery of titanium dioxide, in the recovery of magnesium and magnesia from sea-water, the treatment of acid and metal bearing wastes at low concentrations, the purification treatment of zinc electrolyte, and control of acid concentration in solvent extraction plants, the treatment of acid wastes from pickle liquor baths, the control of acid concentration in electro-winning acid concentration control where sulfur dioxide is injected into electro-winning cells.

Considering such applications in more specific detail the following Example is provided of the use of the acid removal process in the treatment of an acid waste from a pickle liquor bath.

EXAMPLE 12

A waste pickle liquor used in descaling sheet steel containing 16% total acid value sulphate and 6% iron content as ferrous sulfate is contacted with a 10% solution of Alamene 336 in Escaid 100 diluent with 10% isodecanol additive. Extraction contacting and separation is carried out in six stages of counter-current operation to load the acid value onto the amine as amine sulfate/bisulfate at 0.2 molar concentration of sulfuric acid. The resulting aqueous raffinate contains 0.136 M acid value as well as substantially all the ferrous sulfate. The acid loaded amine is then stripped by water wash in counter-current mixer settler equipment consisting of 8 stages of mixing and separating. The organic amine reduction is then reduced in acid content of 0.14 molar sulfuric acid. The product acid contained 0.6M sulfuric acid. Each stage of contacting is carried out with an organic to aqueous flow ratio of 10:1.

In another instance, the acid removal process has been advantageously applied in the titanium ilmenite process. In this process ilmenite, a titanium-iron oxide ore containing 40/45% $TiO_2$, 35% FeO, 6 to 12% $Fe_2O_3$ plus traces of alumina, magnesia silica, niobium, vanadium, chromium, manganese, etc. is ground and then leached at about 160° C. optionally by concentrated $H_2SO_4$ or in the presence of oleum, a concentrated sulfuric acid containing extra $SO_3$. The product of the leach is a cake or iron sulfate and titanium sulfate which is itself leach dissolved with water and, usually, added sulfuric acid in dilute form. In order to ensure iron is in ferrous form, some metallic iron is added at this stage. Likewise there is some reduction of titanium from $Ti++++$ to $Ti++$.

This leach solution is clarified to remove silica and zirconia and the solution is then cooled to crystallise out a proportion of the ferrous sulfate (7 $H_2O$) and yield a liquor containing 230 to 250 gpl of titanium.

This liquor is boiled to hydrolyse the titanium to $TiO_2$. Some nucleation is needed in this step and therefore some titania is recycled from a previous batch. The hydrolysing takes several hours, and more water is added as required in this period for pH adjustment.

The recovered titania is calcined.

According to previous practice, the raffinate containing about 160 gpl of sulfuric acid, about 35 gpl of ferrous sulphate and about 2 gpl of titanium as sulfate would then have been diluted, thickened, further filtered, and taken off as effluent. In the application of the disclosed acid removal process, this stream is drawn off after initial filtration while being the approximate analysis shown above and contacted with a solution of a suitable amine, e.g. Alamene 336, in a suitable water immiscible organic diluent, e.g. Escaid 100 with added isodecanol. The acid-loaded amine is then stripped by water wash in counter-counter flow and the product sulfuric acid containing typically 140 to 150 gpl of sulfuric acid is recirculated to the dilute acid leach step. The ferrous sulfate recovered from the amine treatment step is handled in accordance with conventional practice.

As previously noted, the acid removal process disclosed herein can be applied to the treatment of bleed streams from electrolytic processes.

In most electrolytic processes, such as electro-winning and electro-refining of metal such as copper, cobalt, nickel, zinc, tin, etc., there is a steady build up of impurities in the closed loop of electrolyte which circulates between the source of metal value and the cathode system where metal is deposited. It is common practice to remove a few percent of this liquor continuously, to ensure a maximum level of impurity content. The impurities typically consist of soluble metallic salts.

It is necessary to recover the metal value or values from this bleed stream which is usually acidic and often highly so.

For example in a typical copper electro-refining plant there will be 150 gpl of acid (sulfuric), 35 gpl of copper sulfate and 15 gpl of cobalt impurity. Typical practice would be to electro-win most of the bled copper. The stripped stream would then be concentrated to the point where cobalt was just not crystallising out. The cobalt acidic concentrate is then crystallised. The raffinate may either be returned to the electrolyte or may be neutralised to yield cobalt hydroxide/oxide.

Such a plant is expensive to run because it is small scale, it is troublesome because of corrosion and leakage of the concentrator, and being a sidestream of little interest to operators.

With acid removal according to the present disclosure it is possible to extract acid by the amine process for immediate return to the electrolyte. The deacidified copper-bearing stream may then be contacted with a metal ion-exchange reagent, illustratively Lix 64N for copper, to recover metal value. The raffinate-bearing cobalt value and other impurities may then be neutralised to precipitate the hydroxides of those metal impurities. The equipment involved would require no heat, is cheap, and could work unattended and economically on a very small scale.

Similar application for the disclosed acid removal process is found in the treatment of waste acid from plating baths where the basic problems are similar. The main application is in the electroplating of chromium, silver, nickel, copper and cobalt, although application in the electroplating of other metals is contemplated.

Another area of application for the disclosed acid removal process is in the recovery of magnesium and magnesia from seawater. The general subject is treated in an article entitled "Materials from the Sea . . . Inexhaustible source of Magnesia and Magnesium" by R J Dowsing, pages 21–26, Metals and Materials, January, 1978. According to current practice dolomite magnesium calcium limestone, is crushed and burned to produce CaO and MgO. This is slaked, slurried and classified to remove impurities. Simultaneously seawater is treated with sulfuric acid to drive off $CO_2$ gas from calcium bicarbonate. The dolomitic slurry and the treated seawater are mixed. Magnesium hydroxide is precipitated and collected in a settling tank system. The waste liquor overflow which contains calcium chloride and sulphate is rejected to sea. The underflow is dried in vacuum filters, calcined and pelletised for further use. In carrying out the process it is necessary to deal with impurities such as bromides and silicates to keep their levels low, by careful process reaction conditions control.

Application of the acid removal process enables recovery of part of the acid for recirculation to the bicarbonate treatment section of the input seawater. This also reduces the amount of dolime needed for the precipitation reaction.

If amines could be used to do the whole neutralisation process instead of the dolime then the mining and calcining of the lime could be eliminated altogether. But is is difficult to apply solvent extraction with liquid ion exchangers in the presence of precipitates or dirty fluids and filtration of the whole flow would be too costly. However resin anionic reagents which work in the same way as amines will operate in dirty liquors or in precipitating systems and may suitably be employed in their stead.

The acid removal process disclosed herein also finds application in the treatment of acid and metal bearing waste at low concentration.

There are many sources of such wastes in chemical processes and as effluents from mining operations. These wastes constitute both a pollution hazard and a waste of metal values.

In the treatment of red mud from titanium processes it is found that as the acid level in the waste, is reduced a precipitation of retained titanium as titanium hydroxide occurs. This fouls the ion exchange process, as the fines are not easily separated from the organic.

To overcome this there is added a proportion of versatic 9, 11 carboxylic acid to the amine organic solution, an acid which is pH selective in acting as a cationic exchange reagent. The carboxylic acid will take up metals at or near the pH level at which they would otherwise precipitate. Thus, there is provided a regime in which acid and metals can be simultaneously extracted from wastes by contacting with mixed amine and organic solvents where neither alone would be operable, because either precipitates would form or the pH would be too low to collect metal values.

Stripping of the mixed solvent is a problem since if acid is first water washed out of the amine, then the product acid may tend to strip metal from the versatates. The versatates could be stripped of metals by strong acid, but in doing this more acid would go into the amine. However, versatic acid can be stripped by steam or by hydrogen. Stripping by either of these techniques enables sequential recovery of first metals and then acid with a water wash.

In those instances where amine are used in conjunction with selective ion exchange reagents like Lix 64N, the problem is much less severe since a weak acid solution such as would be obtained by amine water wash regeneration is most unlikely to back extract much absorbed metal.

The acid removal process disclosed herein can also be applied in the treatment of zinc electrolyte.

Neutralisation by lime is a widely used commercial process usually applied to avoid pollution by acidic metal bearing solutions or to selectively precipitate out unwanted metal salts as hydroxides from process liquors, as a means of purification. Typical of the latter operations are precipitation of cobalt hydroxide from cupriferous leach liquors, and the purification of zinc liquor for electrowinning. In most cases excess lime is needed to bring the solution to the pH level at which precipitation will occur. The amine solvent extraction of the excess acid with its return to the leach process enables a reduction in the requirement for lime. Although it would be possible to extract acid to the point of hydroxide precipitation with amines, this is not practical because of the problem of separating the organic liquor from the fine precipitate.

However the treatment of zinc electrolyte is different. In this case most if not all the usual impurities precipitate at lower pH than zinc. Hence it is possible to remove acid from the feed solution by amine, optionally mixed with, for example, versatic acid. When the acid extract into the amine is stopped as pH level reaches about 4.5 to 5.5 most of the metal impurities of import will have entered the versatic in the form of metal versatates but the zinc will remain in solution. A simple water wash will remove acid from the amine and this acid can be used, augmented if necessary to remove the tramp metals from the versatic simultaneously, before it is recirculated for further use.

A further area of application is in the control of acid level in solvent extraction plant. There are many leach liquors which are too acidic for general use in solvent extraction plants employing organic extractants of the type based on hydrocarbons having a straight chain of 9 or 10 carbon atoms terminating in an oxime group modified by adjacent hydroxy or other chemical groups, i.e. the Lix reagents. In general, if the reagent used will extract from a very acid liquor, it will require an extremely strong acid to strip the metal value out and vice versa. Reagents such as the Lix reagents operating at high acidity result in strip liquors which are too acidic for wide spread use in electrowinning operations since the acids attack the anodes.

With Lix 64N and other reagents of this type, the less acid the feed liquor, the more copper the Lix will load and the quicker will be the loading rate. The use of the amine acid removal process reduces the acid level in the seed to a solvent extraction plant based on a Lix reagent and provide significant advantages in plant size and in capital cost.

Use of an amine and a Lix in admixture or in sequential contacting will enable simultaneous acid control and copper recovery. A water wash of the loaded Lix-amine admixture removes acid but not copper value.

As copper is loaded onto Lix, the feed liquor becomes progressively less cupriferous and more acidic. The simultaneous or sequential extraction of acid by amine during loading improves the driving force at the tail end and thus improves recovery efficiency and/or increases plant capacity. This system is applicable to existing plant requiring only the addition of one or more simple amine contacting stages.

The acid removal process disclosed herein can be employed in the control of acid concentration in electro-winning processes.

It is a well known problem of electrowinning processes that the lead anode material, which usually has an alloy content of 6% antimony and, occasionally, some tin and silver, is attacked by the acid in the bath and appears in the cathode product as a lead pollution. Considerable efforts have been expended in research into precious metal anodes and into additives to the electrolyte, such as cobalt, to reduce the effect. The problem first became acute when with the introduction of solvent extraction, the electrolytes became so pure that saleable cathode was possible without a second processing by electrorefining. The only factor preventing the cathodes being marketed as top quality was lead pollution.

Simultaneously, the acid level of the electrolyte was made higher to ensure full stripping of the Lix organic which is often needed to get high process efficiency. Acid levels generally rose from 150 gpl to 180 gpl and lead pollution increased significantly because of this. Hence, many processors are now using precious metal anodes in solvent extraction plants to overcome the problem despite the attendant high cost.

With the application of the acid removal process the acid level in the tankhouse feed, may now be reduced and the recovered acid is returned to the strip stage of solvent extraction, thus providing almost complete independence of said level selection in the two process steps.

Similarly, use is made of the acid removal process in sulfur dioxide injection into electrowinning cells.

It is known that by injecting $SO_2$ into electrowinning cells the energy needs to recover a given weight of copper are reduced. The reason is because a cuprous cupric salt Chevreul or red salt, is formed. Obviously the conversion of the cuprous component to metal needs only half of the theoretical energy of the cupric.

However, the reduction from cupric to cuprous by sulfur dioxide results in the release of extra sulfuric acid. Unless the extra acid is removed, the acid level in the circuit will build up steadily and rapidly. This would not be a problem in a conventional leach/electrowinning plant where impure electrolyte is used since the excess acid might be consumed in leaching more ore. However in solvent extraction systems the electrolyte circuit is closed, and neutralisation of excess acid would be very difficult.

The amine acid removal process may be applied to remove the excess acid resulting from sulfur dioxide injection into the electrowinning cell to effect the reduction from cupric to cuprous method.

Another area of industrial application for the acid removal process disclosed herein is in the treatment of aluminum phosphoric acid liquor. To establish the effectiveness of the acid removal process in this application an aqueous solution containing 20 grams/liter of aluminum, 10 grams/liter of nitric acid, 10 grams/liter of sulfuric acid and 294 grams/liter of of free phosphoric acid is prepared.

A 25 ml portion of this solution is manually shaken with an equal volume of 5 w/v % of Alamene 336 and 10 weight/volume % of isodecanol in Escaid 100. Analysis indicates about a 10% loading of phosphoric acid in the Alamene 336 while loading for the total strong acids, that is sulfuric acid, nitric acid and phosphoric acid is high. Similar results in total loading where the concentration of phosphoric acid is varied indicates that the total acids extracted are chiefly sulfuric acid and nitric acid.

These results indicate that nitric acid and/or sulfuric acid would be preferentially extracted and eventually inhibit further phosphoric acid extraction even by addition. However, use is made of the strong preferential extraction of nitric and sulfuric acid by using the amine extractant to remove these two acids from the liquor prior to the desired phosphoric acid extraction.

In such a procedure, amine extractant is contacted with a flow of aluminum-phosphoric acid liquor at a phase ratio selected to extract most of the nitric and sulfuric acids and totally load the extractant. The strong preferential extraction of these acids ensures that any phosphoric acid previously left in the amine is back stripped into the aqueous phase at this stage. The amine is then stripped of its nitric and sulfuric acid content with alkali and returned to its original source. The aluminum-phosphoric acid liquor, which is now depleted of nitric and sulfuric acids but enriched with phosphoric acid, is contacted with further amine and phosphoric acid is now extracted into such amine reagent. The phosphoric acid loaded extractant is then stripped with water, giving the desired free phosphoric acid.

In a further example, conducted in the absence of sulfuric and nitric acids in the solution an extractant containing 10% w/v of Alamene 336, 19% w/v of isodecanol in Escaid 100 was used. This organic solution is shaken with an aqueous solution initially containing 20 g/l of aluminum as aluminum phosphate and 1 Molar (98 g/l) free phosphoric acid. It was found that under equilibrium conditions 0.175 moles of phosphoric acid value was loaded into the amine organic solution.

Returning again to the integrated process wherein the acid removal process is specifically applied according to the present invention, it should be noted that while the invention has been previously discussed in terms of the use of certain particular substances, the invention is not to be considered as so limited. Thus, while the disclosure has been principally made in connection with the use of Lix-64N, other substances of similar nature can be employed in its stead, such as those discussed in U.S. Pat. No. 4,036,639 at columns 8 and 9 and U.S. Pat. 3,927,169 at columns 2, 3 and 4.

While particular attention has been given to the use of isodecanol as the modifier other materials are available, such as the various alcohols disclosed for this purpose in U.S. Pat. No. 3,869,360 in the paragraph bridging columns 9 and 10.

Similarly, the foregoing patent as well as U.S. Pat. No. 3,927,169 provide discussions and illustrations of suitable organic solvents at columns 9 and 7, respectively.

Again, while the preceding disclosure has been made with particular reference to Alamene 336, substantially trioctylamine, as the organic extractant, this is not the only organic extractant which can be used, tributylphosphate being suitable, with certain acids, and is exemplary only of other long chain molecules including tertiary amines which can be so employed. Thus di-nonyl amine can also be employed. When 1 volume of 0.5 M di-nonyl amine in benzene is shaken with 1 volume of aqueous acid containing 160 g/l of sulfuric acid, and following phase separation, the organic is again shaken with a fresh volume of 160 g/l of sulfuric acid, and the process again repeated, successive acid loadings in the organic phase of 80.6%, 84.2% and 84.4% of theoretical are obtained.

What is claimed is:

1. A process for recovering copper from a copper bearing material comprising the following steps:
    (a) leaching the copper bearing material in oxide form with sulfuric acid to obtain a copper sulfate containing aqueous liquor and an insoluble residue;
    (b) separating the copper sulfate-containing aqueous liquor from the insoluble residue;
    (c) contacting the separated copper sulfate-containing aqueous liquor with an organic extractant for copper of the ionic exchange type having substantially greater affinity for copper ions than other cations present in the aqueous leach liquor to extract the copper value from the aqueous leach liquor;
    (d) contacting the copper containing organic extractant with an aqueous solution of sulfuric acid to strip the copper in the form of copper sulfate from the copper-carrying organic extractant, thus reconstituting the organic extractant and forming a purified aqueous acidic copper sulfate solution;
    (e) passing the purified aqueous acidic copper sulfate solution to an amine solvent extraction step wherein an organic solution of amine salt is formed, separating the amine salt and contacting it with water whereby the amine is regenerated and sulfuric acid is recovered from the amine salt solution;
    (f) contacting the copper sulfate-containing solution with a sulfur dioxide type reductant whereby metallic copper is precipitated and sulfuric acid solution is produced;
    (g) recycling the sulfuric acid solution to the copper stripping step; and
    (h) recovering the precipitated copper.

2. A process according to claim 1 wherein, in step (f), the reducing gas is sulfur dioxide per se.

3. A process according to claim 1 wherein, in step (f), the sulfur dioxide is formed in situ by the action of acid on a suitable salt.

4. A process according to claim 3 wherein the salt is sodium sulfite.

5. A process according to claim 4 wherein the amine extractant comprises substantially trioctylamine.

6. A process according to claim 4 wherein the amine extractant is trioctylamine.

7. A process according to claim 1 wherein the amine extractant in step (e) is an alkyl amine.

8. A process according to claim 5 wherein the amine extractant is dissolved in a substantially water-immiscible organic diluent.

9. A process according to claim 8 wherein a modifier is present in the solution.

10. A process according to claim 9 wherein the modifier is isodecanol.

11. A process according to claim 1 wherein in step (c), the organic extractant for copper is a hydrocarbon terminating in an oxime group modified by adjacent hydroxyl groups.

12. A process for recovering copper from a copper bearing material comprising the steps of:
    (a) providing the copper bearing material in oxide form;
    (b) leaching the copper oxide with an aqueous sulfuric acid at or near ambient temperature and pressure and at a terminal pH of 1.5 to 4 to obtain a copper sulfate-containing aqueous liquor and an insoluble residue;
    (c) separating the copper sulfate-containing aqueous liquor from the insoluble residue;
    (d) contacting the copper sulfate-containing aqueous liquor with a 2% to 40% by weight solution of a selective organic ion exchange reactant dissolved in a hydrocarbon solvent;
    (e) contacting the solution of copper-containing organic extractant with an aqueous solution of sulfuric acid having a free acid content of 50 to 350 grams per liter of sulfuric acid to strip the copper value from the copper-carrying organic extractant, thereby forming an aqueous acidic copper sulfate solution;
    (f) contacting the purified aqueous acidic copper sulfate solution with a solution of 5 to 40% by volume of trioctylamine aromatic hydrocarbon solvent containing one half to twice the quantity of trioctylamine of isodecanol to form the amine sulfate and contacting the amine sulfate solution with water to regenerate the amine and recover the sulfuric acid formed;
    (g) contacting the copper sulfate-containing solution with sulfur dioxide in at least one stage at a temperature of 100 to 220° C. for a period of about 2 minutes to about 180 minutes, the molar ratio of sulfur dioxide to copper being about 1:1 to 1.8:1, wheregy metallic copper is precipitated and sulfuric acid solution is produced;
    (h) recycling the sulfuric acid solution to the copper sulfate stripping step; and
    (i) recovering the precipitated copper.

* * * * *

UNITED STATES PATENT AND TRADEMARK OFFICE
CERTIFICATE OF CORRECTION

PATENT NO. : 4,150,976  
DATED : April 24, 1979  
INVENTOR(S) : Richard J. Dain

It is certified that error appears in the above-identified patent and that said Letters Patent are hereby corrected as shown below:

Column 2, line 44 - "be" should read -- the -- .

Column 6, line 8 - "to the" should read -- of the -- .

Column 7, line 3 - after "as is" add -- practical without increasing the viscosity of the organic solution under the operating conditions to the point at which separation of aqueous and organic phases becomes too time consuming. In general, the concentration level is in the range of 5% to 45% by volume and preferably is in the range of 5% to 20% by volume. The ratio of organic phase to aqueous phase in acid extraction step is selected to ensure that -- .

UNITED STATES PATENT AND TRADEMARK OFFICE
CERTIFICATE OF CORRECTION

PATENT NO. : 4,150,976
DATED : April 24, 1979
INVENTOR(S) : Richard J. Dain

It is certified that error appears in the above-identified patent and that said Letters Patent are hereby corrected as shown below:

Column 8, line 36 -  "20%" should read -- 22% -- .

Column 12, line 44 - "and" should read -- the -- .

Column 16, line 54 - "said" should read -- acid -- .

Column 17, line 53 - "19%" should read -- 10% -- .

Column 20, line 24 - "wheregy" should read -- whereby -- .

Signed and Sealed this

Twenty-second Day of January 1980

[SEAL]

Attest:

SIDNEY A. DIAMOND

Attesting Officer

Commissioner of Patents and Trademarks